(12) United States Patent
Kennedy (10) Patent No.: US 11,589,573 B1
(45) Date of Patent: Feb. 28, 2023

(54) AUTOMATIC DUCK DECOY JERK STRING AND METHOD OF USING THE JERK STRING TO MOVE DUCK DECOYS

(71) Applicant: Easton Thomas Kennedy, Bentonville, AR (US)

(72) Inventor: Easton Thomas Kennedy, Bentonville, AR (US)

( * ) Notice: Subject to any disclaimer, the term of this patent is extended or adjusted under 35 U.S.C. 154(b) by 24 days.

(21) Appl. No.: 17/463,589

(22) Filed: Sep. 1, 2021

(51) Int. Cl.
    *A01M 31/06*     (2006.01)
    *F16H 37/12*     (2006.01)

(52) U.S. Cl.
    CPC .......... *A01M 31/06* (2013.01); *F16H 37/124* (2013.01)

(58) Field of Classification Search
    CPC .............................. A01M 31/06; A01K 91/065
    USPC ......................................... 43/3, 2, 19.2, 26.1
    See application file for complete search history.

(56) References Cited

U.S. PATENT DOCUMENTS

| | | | | |
|---|---|---|---|---|
| 217,483 A | * | 7/1879 | Redmond | A01M 31/06 43/3 |
| 970,003 A | * | 9/1910 | Wethall | A01M 31/06 43/3 |
| 1,831,286 A | * | 11/1931 | Chelini | A01M 31/06 43/3 |
| 1,836,504 A | * | 12/1931 | Prince | A01M 31/06 43/3 |
| 2,028,849 A | * | 1/1936 | Shay | A01M 31/06 43/3 |
| 2,129,781 A | * | 9/1938 | Park | A01M 31/06 43/3 |
| 2,174,211 A | * | 9/1939 | Hutaff, Jr. | A01M 31/06 43/3 |

(Continued)

FOREIGN PATENT DOCUMENTS

| | | | | |
|---|---|---|---|---|
| CA | 2391478 A1 | * | 12/2003 | ............ A01M 31/06 |
| CA | 2851882 A1 | * | 11/2014 | ............ A01M 31/06 |

(Continued)

OTHER PUBLICATIONS

Easton Thomas Kennedy, "Engineering Design & Development," presented to high school class May 2021, pp. 1-53.

(Continued)

*Primary Examiner* — Darren W Ark
(74) *Attorney, Agent, or Firm* — Jeffrey S. Melcher; Melcher Patent Law PLLC (57) ABSTRACT

An automatic duck decoy jerk string device 1 having an enclosure 2, a mounting pole 6, a lockable mount 8 for mounting the enclosure 2 at different heights on the mounting pole 6, an electric motor 10 in the enclosure 2, a battery 12 configured to power the electric motor 10, a speed control 13 to control a rotational speed of a motor drive shaft 16, an elongated slider 20 partially inside the enclosure 2 and partially outside the enclosure 2, the elongated slider 20 moves back-and-forth towards the inside of the enclosure and away from the inside of the enclosure, a gear system 14 connected to the motor drive shaft 16 to reduce the rotational speed of the motor drive shaft 16 and rotate a drive arm 18, and a link arm 28 is rotatably mounted to the drive arm 18 and rotatably mounted to the first slider end 22. A method of using the jerk string device to move duck decoys 48 on a jerk line 38 connected to the elongated slider 20.

6 Claims, 6 Drawing Sheets

(56) References Cited

U.S. PATENT DOCUMENTS

| | | | | |
|---|---|---|---|---|
| 2,252,795 A * | 8/1941 | Weems | A01M 31/06 43/3 |
| 3,016,647 A * | 1/1962 | Peterson | A01M 31/06 43/3 |
| 3,031,790 A * | 5/1962 | Duryea | A01K 91/065 43/26.1 |
| 4,120,112 A * | 10/1978 | McBain | A01K 91/065 43/26.1 |
| 4,141,167 A * | 2/1979 | Muehl | A01M 31/06 43/2 |
| 4,237,642 A * | 12/1980 | Petorella | A01K 91/18 441/35 |
| 4,322,908 A * | 4/1982 | McCrory | A01M 31/06 43/3 |
| 4,535,560 A * | 8/1985 | O'Neil | A01M 31/06 43/3 |
| 4,680,885 A * | 7/1987 | Lindell | A01K 91/065 43/26.1 |
| 4,910,905 A * | 3/1990 | Girdley | A01M 31/06 43/3 |
| 4,916,847 A * | 4/1990 | Rusgo | A01K 91/065 43/26.1 |
| 4,932,151 A * | 6/1990 | Cicha | A01K 91/065 43/26.1 |
| 5,084,995 A * | 2/1992 | Beaudoin | A01K 91/065 43/26.1 |
| 5,540,010 A * | 7/1996 | Aragona | A01K 91/065 43/26.1 |
| 5,570,534 A * | 11/1996 | Ford | A01K 97/11 43/16 |
| 6,311,425 B1 * | 11/2001 | Capps | A01M 31/06 43/3 |
| 6,374,529 B1 * | 4/2002 | Petroski | A01M 31/06 43/3 |
| 6,412,210 B1 * | 7/2002 | Horrell | A01M 31/06 446/155 |
| 6,574,902 B1 * | 6/2003 | Conger | A01M 31/06 43/2 |
| 6,834,458 B1 * | 12/2004 | Hand, III | A01M 31/06 43/2 |
| 7,322,144 B2 * | 1/2008 | Brewer | A01M 31/06 43/3 |
| 7,963,064 B2 * | 6/2011 | Smith | A01M 31/06 43/2 |
| 8,950,103 B2 * | 2/2015 | Bullerdick | A01M 31/06 43/2 |
| 9,629,356 B1 * | 4/2017 | Frierson, II | A01K 91/065 |
| 9,668,469 B2 * | 6/2017 | Leventini | A01M 31/06 |
| 10,194,652 B1 * | 2/2019 | Bloomquist | G10L 25/51 |
| 10,420,336 B2 * | 9/2019 | Lynn | B61B 7/00 |
| 10,609,920 B2 * | 4/2020 | Smith | B65H 75/4471 |
| 10,729,125 B2 * | 8/2020 | Beauchamp | A01M 31/06 |
| D886,939 S | 12/2020 | Hebert | |
| 10,856,544 B2 | 12/2020 | Noe | |
| 2003/0041500 A1 * | 3/2003 | Thomas | A01M 31/06 43/2 |
| 2003/0204983 A1 * | 11/2003 | Porter | A01M 31/06 43/3 |
| 2006/0207158 A1 * | 9/2006 | Brewer | A01M 31/06 43/3 |
| 2014/0338248 A1 * | 11/2014 | Leventini | A01M 31/06 43/2 |
| 2016/0100569 A1 * | 4/2016 | Hudson | A01M 31/06 43/3 |
| 2018/0014530 A1 * | 1/2018 | Sturm | B66D 1/60 |
| 2021/0368759 A1 * | 12/2021 | Kwon | A01K 91/065 |
| 2022/0304297 A1 * | 9/2022 | Springer, III | B65H 75/4484 |

FOREIGN PATENT DOCUMENTS

| | | | |
|---|---|---|---|
| FR | 1436463 A | * | 4/1966 |
| FR | 3062283 A1 | * | 8/2018 |
| SU | 102446 A1 | * | 11/1955 |

OTHER PUBLICATIONS

Brantley, "10 Surefire Decoy Strategies," Ducks Unlimited, www.ducks.org, 2021, pp. 1-7.

Buckley, "Know-How: On-the-fly Ducks," Jan. 2, 2015, NRA, American Hunter, pp. 1-6.

Shead, "Get Moving: 9 Motion Decoys for Waterfowls," Oct. 10, 2019, Drake Waterfowl, pp. 1-4.

Buice, "Duck Hunting Trouble, Is your spread dead?" Dec. 13, 201, realtree.com, pp. 1-2.

Bourne, "The right kind of movement in your decoy spread can make all the difference," Ducks Unlimited, www.ducks.org, 2021, pp. 1-9.

Delta Waterfowl, "Basics of Waterfowling," Delta Waterfowl, Nov. 8, 2018, pp. 1-2.

* cited by examiner

AUTOMATIC DUCK DECOY JERK STRING AND METHOD OF USING THE JERK STRING TO MOVE DUCK DECOYS

FIELD OF THE INVENTION

The invention relates to a device for moving water fowl decoys for attracting waterfowl, and more particularly to a decoy pull line actuating apparatus which repeatedly pulls and releases a decoy pull line to which one or more waterfowl decoys are attached as the decoys float on a body of water to impart lifelike motion to the decoys.

BACKGROUND OF THE INVENTION

There is a wide variety and array of both automatic and manual water fowl decoy systems available on the market today. One of the most manual is commonly referred to as a "jerk string". Even though they take some time to set up, they are fairly inexpensive and work quite well; the only problem being that the hunter has to manually pull the line in order to engage the action of the decoys. With all the other duties of scouting, calling and shooting, this can be difficult at times. If a lightweight, portable, "automated jerk string" was offered, it would solve many of these issues and be a cost-effective duck decoy system.

Conventional automatic jerk strings don't pull the decoys back quite enough and the automatic decoys don't give enough movement unless you have a lot of them. I thought that the noise of both the automatic devices would flair off the ducks but it doesn't seem to bother them. Ducks are not afraid of noises like that. When I put the generator and ice heater out it doesn't bother them. It's probably because there so used to the noise of all the farming equipment and pumps going into the fields.

Hampton Bourne discusses the importance of motion in decoys. The first part of the article explains the different concepts of motion. There's long-range strobe motion, and simple motion. Long-range strobe motion is the super flashy movements that get a ducks attention. These are the bright decoys that flash their wings and can spin their wings. The other type of motion is simple motion. Simple motion is the water motion. This is what gets the ducks to finish and land in your hole. These are the decoys that create ripples in the water and smaller movements that bring everything to life. The second part of the article explains the use for spinning decoys. They are not to get the ducks to land since they are only used to get a duck's attention. Once the ducks get close, it's a good idea to turn your spinning wing decoys off so it doesn't scare the ducks away. The last part of the article explains the importance of keeping everything subtle. You don't need a lot of flashy spinning wings, only a couple. Keep everything as natural as possible.

It is important to know the difference in the decoys you are using. Some are used for catching ducks attention while the others are only used for getting the duck to land in your spread. This site explained the difference between these two categories of decoys which helped further my understanding with decoys and how to set them up correctly.

Realtree's Joe Shead explains nine different types of motion decoys. There's the jerk string, the flag, quiver decoys, spinning wing decoys, LED wing decoys, tornado decoys, carousel decoys, splashing decoys, and tip-up decoys. The main decoy setups people use are jerk strings, spinning wing decoys, and splashing decoys. Every one of these decoys have their own problems. There either too heavy, too complicated to set up, too loud, or they do not produce enough motion. There is a need for a duck decoy that solves these problems.

Will Brantley writes ten Surefire Decoy Strategies. The first way was to make the spread visible. Use lots of decoys and show lots of movement. The second way is to keep water open around your decoys. There needs to be space around for the ducks to still be able to land. The third tip was to set a floating spread for Canada geese. Almost anytime you go on a duck hunt, geese will probably show up as well. For the fourth tip, Will stated "Use goose decoys for ducks." He says this because ducks tend to stick with geese every once in a while. The fifth tip is to spread out decoys in flooded timber. Most people keep their decoys too grouped together. Number six is to deploy the ultimate diver spread. Some ducks are divers and if you plan on shooting divers, then you need the decoys for it. The most important tip was "don't skip on realism." If there was one point the author was trying to get across this entire article, was don't trade quantity for quality. The quality of the decoy spread is much more important than quantity. The number of decoys is extremely important, but it is way more important to make sure you have them set out in the right place, in the right order, and have the right decoys with you. The article described different strategies when setting up decoys that will help with attracting birds toward you.

Delta Waterfowl shows lots of step by step videos, guides, and tutorials on duck hunting. Some of the main videos on the site were boating safety, choosing a duck call, duck calling fundamentals, cleaning ducks, and decoys placements. Diver Strategies for Decoy-Challenged Hunters discloses that on a lot of hunts you are not able to carry out hundreds of decoys so you need to make the couple dozen you have count. Make sure the decoys are spread out, but not too spread out to where it looks unnatural. If you cannot have a lot of decoys, then put them in the same area instead of making a hole in the middle for the ducks to land. Maybe place 4 of 5 ducks farther away from the others to add to the illusion. You won't be able to have a hundred decoys on every hunt. This site helped explain what to do in the situations when you can only carry a handful of decoys and might not be able to have a large number of motorized decoys.

The first main point the NRA brought up is to be aware of what's happening around you. Every waterfowler knows that scouting is the single most-important component to consistent success. The second point is scouting long-distance, from home. Hunting destinations far from home can often be scouted by telephone. State fish-and-game offices are great sources of information that many hunters fail to fully appreciate. The third tip is to be a weather watcher. Waterfowl movement is intricately tied to weather. Another tip mentioned was maximize your spreads visibility. Even if you're fortunate to hit a big migration day, your decoys can only do their job if they're visible. Obviously, the closer you are to a flight path, the better chance you stand of being seen. But even at distances up to 1,000 yards, you could still be in the game, although, decoy placement, color, size and movement will play crucial roles. The final point, be an opportunist and act fast. In fact, because you'll be set up where you think birds will be, but without any confirmation from on-the-ground scouting, those first flocks should always determine what you do next.

Duck hunting takes a lot of skill and strategy. Sometimes weeks of planning can lead up to one hunt. You have to know the weather patterns, the wind direction, the breed of ducks you'll be shooting, their flight patterns, and even the height there usually flying at when they pass over. This article was helpful in explaining all of these things but there wasn't a ton of talk and tips over decoys. It was helpful to see what needs set up for certain hunts though. The article also helped in explaining the importance of planning everything out strategically.

James Buice has written about the importance of decoy movement in the article. James Buice talks about jerk strings, squirters, swimmers, splashers, mojos, and all the other remote control decoys. He talks about how one hunt he was out late and it cost him the good hunting spot he wanted so he had to go to the worse spot that was right across from it. Early in the morning all the ducks were landing in the good spot because there was a slight breeze but as the breeze died down all the ducks started dropping into Buice's hole. Buice scoped out his competitors' field and noticed they had no movement in their decoys looked fake. This just shows the importance of movement in decoys.

U.S. Pat. No. 9,629,356 (Frierson) discloses a duck design that does not use "a pull arm pivotally carried by the apparatus frame and drivingly engaged for reciprocation by the actuating arm." This patent describes an automated version of a jerk string. A jerk string is a line with lots of waterfowl decoys attached to it. At one end of the line there is a handle to pull and at the other end there is an anchor with a bungee string attached to it. You pull the handle and it makes all the decoys attached move. Frierson uses motors to move along arm attached to the body of the apparatus. The line is attached to the arm so when the arm swings back and forth the line is being pulled. The automatic jerk string that Frierson made is big and bulky. It takes a lot of energy to move around and it is loud. There is a way more efficient way making one of these jerk lines. There is too much movement outside of the enclosure that could flare the ducks. Battery is too heavy.

U.S. Pat. No. 10,856,544 (Noe) discloses a motion decoy called a mojo. A mojo is a fake duck that sits up on a post with two wings coming out the side. The wings spin on the decoy so it makes it look like the duck is landing in the water. Unlike a lot of the motion decoys, this one comes with a controller. This decoy is only used to get the birds attention so you want to turn it off when the ducks start circling you. The mojo is useful, but like all the other automated decoys, it is way too heavy, and it has way too many parts. To use the spinning wing decoy, you have to have three parts for the stand, both wings, the body of the bird, and the remote. That's just for one decoy. If you want multiple, then you have to carry even more parts.

U.S. Pat. No. 10,729,125 (Beauchamp) discloses a duck decoy machine. Much like the jerk string, this decoy machine creates movement in the water. Decoys are attached to a hub system and motor. The motor spins the poles around which makes the decoys swim in circles. The ducks swimming in circles makes the decoy spread look more realistic and convincing for a duck to land. Just like described, it with the previous two patents, this device is way too heavy to use. It has a big enough motor to swim at least 12 decoys around and super long poles sticking out the side. It is useful if you can figure out how to carry this big device out with you. The only way this is usable is if you set it out the night before.

U.S. Pat. No. D886,939 (Herbert) discloses a simpler device than the previously described devices. This is a line that it attached to the decoys to anchor them down. The line has a weight on one side there's a loop on the other to hook all the lines together. Attached to the line is a hood that slides up and down the line, and you can attach this hook to the decoy. Since the line has a weight at the bottom, it adds a lot of unneeded drag to the jerk line. This isn't a problem when you are manually pulling the jerk line, but it would be easier to find a way to not have to use the weight in an automatic version.

U.S. Pat. No. 10,194,652 (Bloomquist) discloses an automatic jerk rig. This jerk rig has a microphone on the side of it so when the duck call is blown the microphone picks up the sound and starts moving the line. This makes the decoys attached to the line swim back and forth. The line also moves at different speeds depending on the sound that it hears. When you are blowing a duck call, it means that ducks are close. Jerk strings are only used to get ducks attention and they can sometimes scare off the ducks if it is still moving while they are trying to land. If you are using a duck call when ducks are trying to land it is going to cause this machine to start moving and it could potentially scare off the Ducks.

SUMMARY OF THE INVENTION

The invention solves the problems of prior art duck decoy jerk strings discussed above. The invention provides a lightweight, easy to setup, and effective duck decoy jerk string. It is good to have a jerk string with you at all times since it is light to carry and adds a lot of movement to your spread. It may be harder to set up than all the other decoys, but it is worth it in the end.

The objectives of the invention and other objectives can be obtained by an automatic duck decoy jerk string device 1 comprising:
  an enclosure 2 having a sealable lid 4;
  a mounting pole 6 for mounting in or above ground;
  a lockable mount 8 for mounting the enclosure 2 at different heights on the mounting pole 6;
  an electric motor 10 in the enclosure 2 having a motor drive shaft 16;
  a battery 12 configured to power the electric motor 10 in the enclosure 2;
  a speed control 13 to control a rotational speed of the motor drive shaft 16;
  an elongated slider 20 having a first slider end 22 inside the enclosure 2 and a second slider end 24 outside the enclosure 2, the elongated slider 20 is configured to move back-and-forth towards the inside of the enclosure 2 and away from the inside of the enclosure 2;
  a gear system 14 connected to the motor drive shaft 16 to reduce the rotational speed of the motor drive shaft 16;
  a drive arm 18 connected to the gear system 14 so that when the motor drive shaft is rotated the gear system 14 rotates the drive arm 18;
  a first link arm end 30 of a link arm 28 is rotatably mounted to the drive arm 18;
  a second link arm end 32 of the link arm 28 is rotatably mounted to the first slider end 22, wherein rotation of the drive shaft 16 moves the elongated slider 20 back-and-forth; and
  an off/on switch 34 for connecting and disconnecting power from the battery 12 to the electric motor 10.

The objectives of the invention are further obtained by a method of moving duck decoys comprising:
  installing a mounting pole 6 in or above ground near a body of water;
  installing an enclosure 2 having a sealable lid 4 at a desired height on the mounting pole 6 using a lockable mount 8, wherein
    an electric motor 10 is in the enclosure 2 having a motor drive shaft 16;

a battery 12 configured to power the electric motor 10 is in the enclosure 2;

a speed control 13 to control a rotational speed of the motor drive shaft 16;

an elongated slider 20 having a first slider end 22 inside the enclosure 2 and a second slider end 24 outside the enclosure 2, the elongated slider 20 is configured to move back-and-forth towards the inside the enclosure and away from the inside of the enclosure;

a gear system 14 connected to the motor drive shaft 16 to reduce the rotational speed of the motor drive shaft 16;

a drive arm 18 connected to the gear system 14 so that when the motor drive shaft 16 is rotated the gear system 14 rotates the drive arm 18;

a first link arm end 30 of a link arm 28 is rotatably mounted to the drive arm 18;

a second link arm end 32 of the link arm 28 is rotatably mounted to the first slider end 22, wherein rotation of the drive shaft 16 moves the elongated slider 20 back-and-forth; and an off/on switch 34 for connecting and disconnecting power from the battery 12 to the electric motor 10;

connecting a first jerk line end 39 of a jerk line 38 to the second slider end 24;

connecting a second jerk line end 40 to a biasing device 42 that biases the jerk line 38 in a direction away from the enclosure 2;

securing the biasing device 42 in place with the jerk line 38 taught between the biasing device 42 and the enclosure 2;

installing a plurality of duck decoys 48 spaced-apart on the jerk line 38; and activating the electric motor 10 to move the elongated slider 20, the jerk line 38, and duck decoys 48 back and forth, with the jerk line 38 expanding the biasing device 42 when the jerk line 38 moves towards the enclosure 2 and the biasing device 42 contracting and pulling the jerk line 38 in the direction away from the enclosure 2.

DETAILED DESCRIPTION OF THE INVENTION

The invention will now be explained with reference to the attached non-limiting drawings. To facilitate an understanding of the principles and features of the various embodiments of the present invention, various illustrative embodiments are explained below. Although example embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways.

As used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

While certain implementations of the disclosed technology have been described in connection with what is presently considered to be the most practical and various implementations, it is to be understood that the disclosed technology is not to be limited to the disclosed implementations, but, on the contrary, is intended to cover various modifications and equivalent arrangements included within the scope of the appended claims. Although specific terms are employed herein, they are used in a generic and descriptive sense only and not for purposes of limitation.

Figure 7:
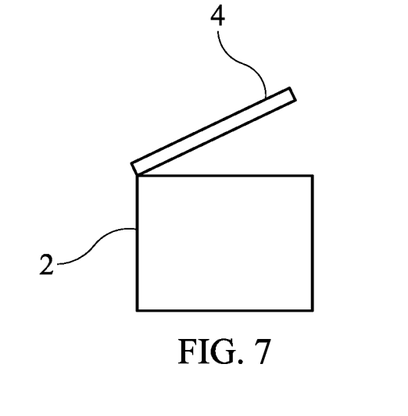
FIG. 7 illustrates an enclosure.

FIGS. 1-6 illustrate a automatic duck decoy jerk string device 1. The duck decoy jerk string device 1 comprises an enclosure 2 having a sealable lid 4. A preferred example of an enclosure 2 is a well-known ammo box which is waterproof, as shown in FIG. 7. The enclosure 2 protects the electrical and moving components from the environment and reduces any unwanted sounds.

Figure 4:
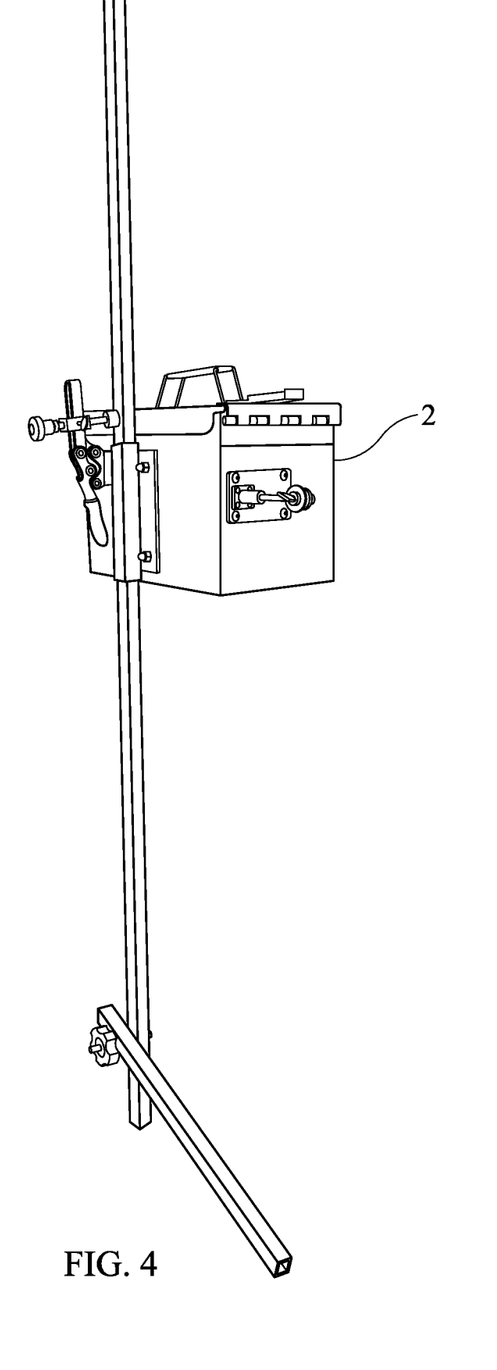
FIG. 4 is a view of the decoy pull line actuating device mounted on a pole.

The enclosure 2 is mounted on a pole 6 using a lockable mount 8 for mounting the enclosure 2 at different heights on the mounting pole 6. The mounting pole 6 can be inserted into the ground or sit on top of the ground.

Figure 1:
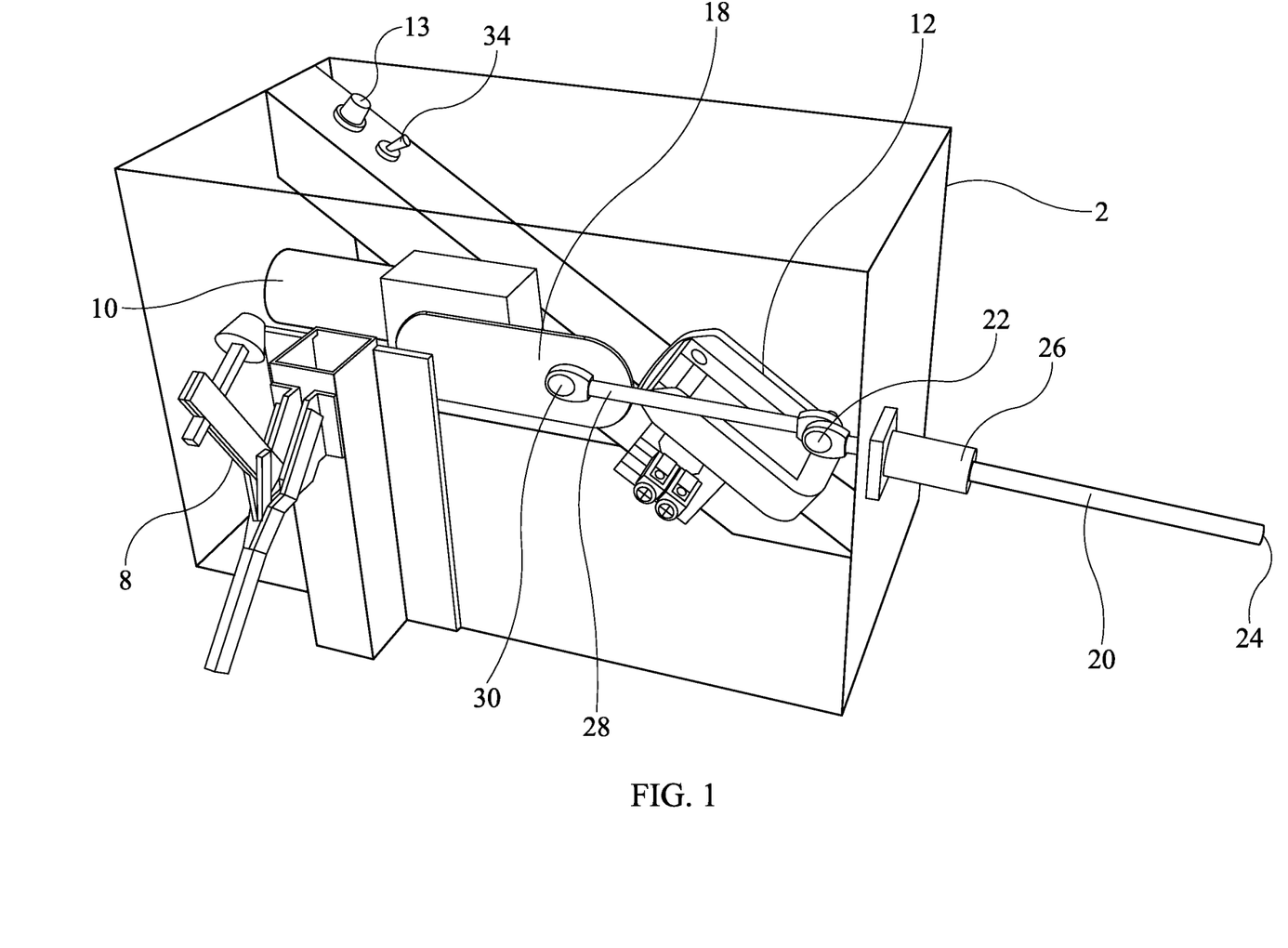
FIG. 1 is a perspective view of the decoy pull line actuating apparatus.
Figure 2:
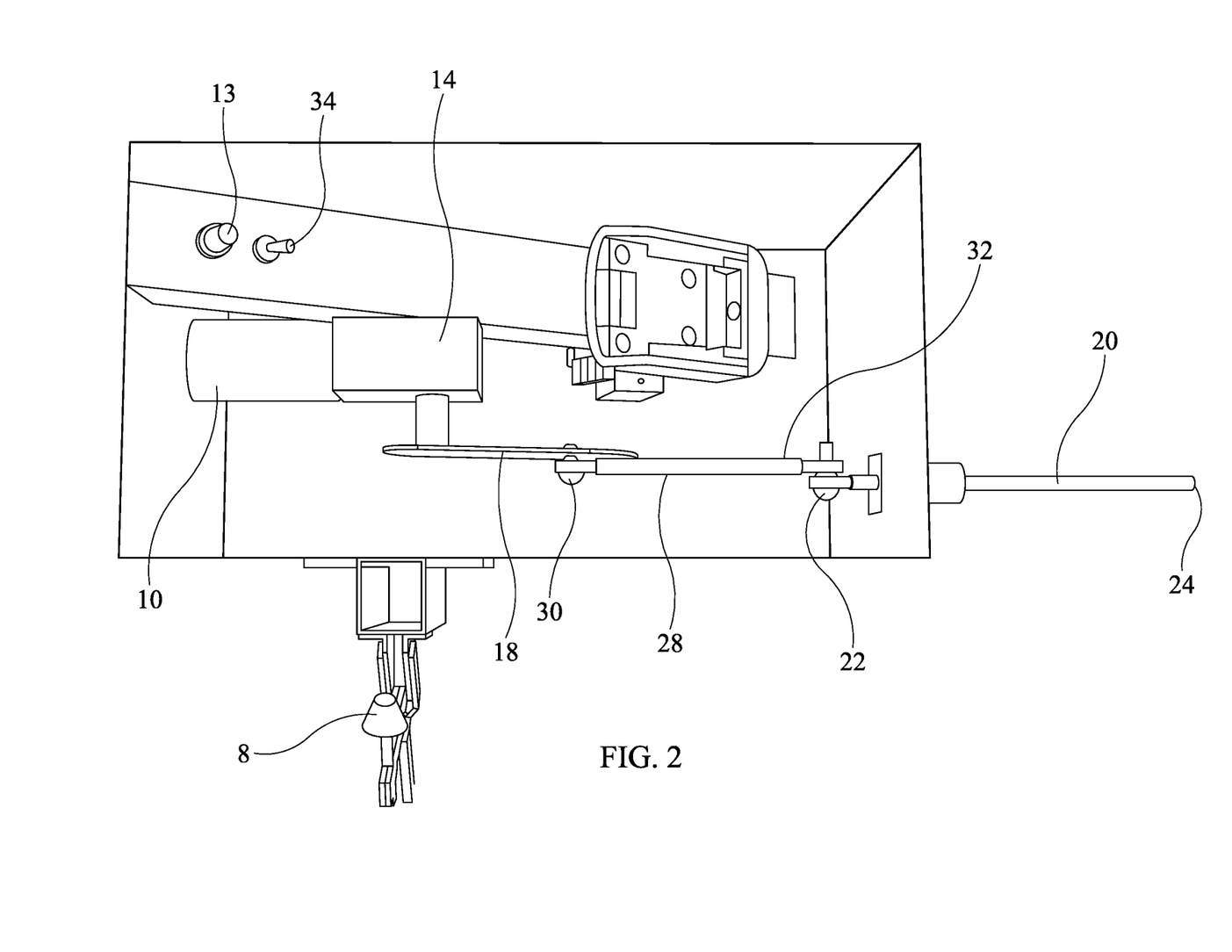
FIG. 2 is a top view of the decoy pull line actuating apparatus.
Figure 3:
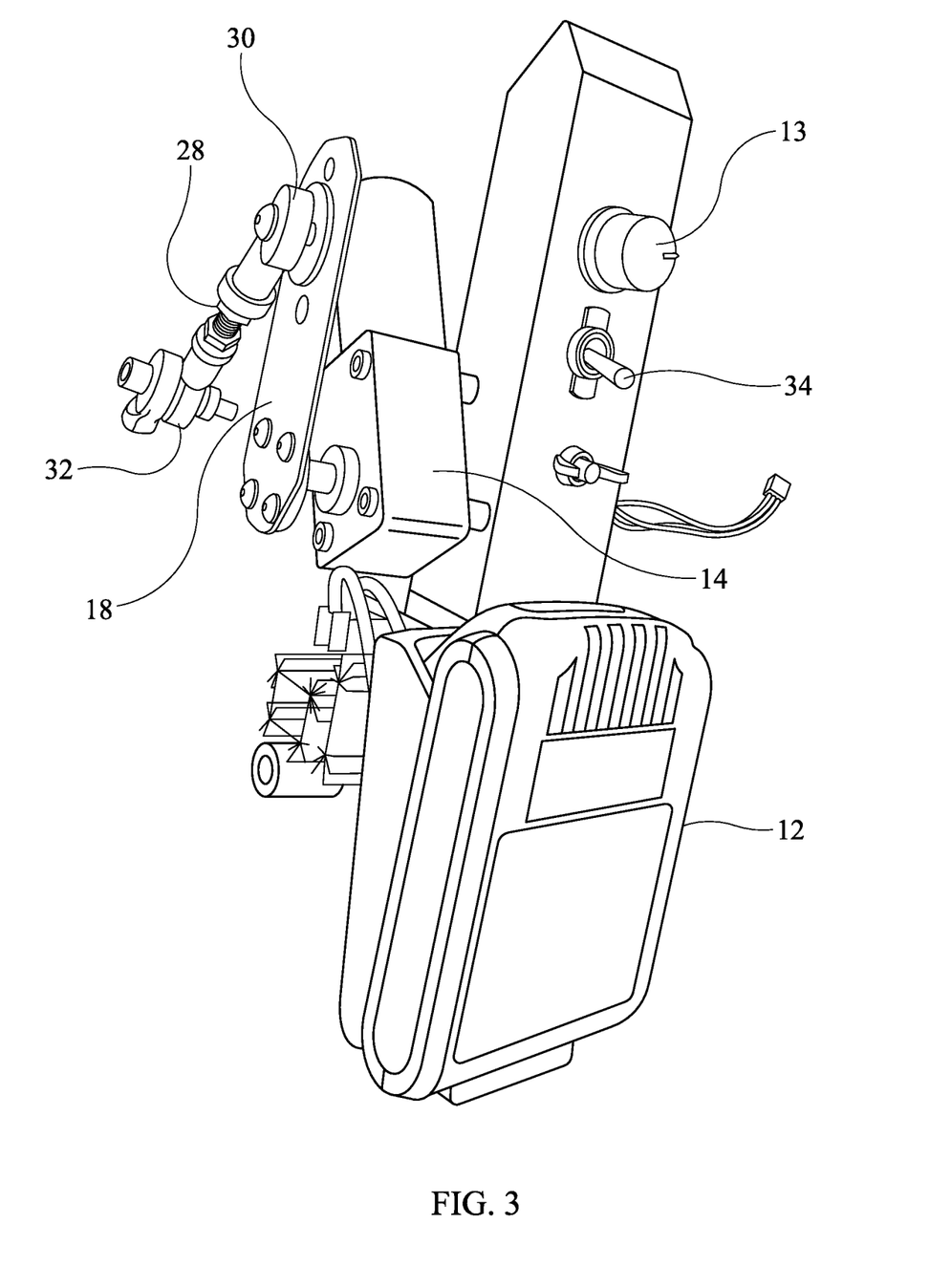
FIG. 3 is an inside view of the illustrative decoy pull line actuating apparatus.

Inside the enclosure 2 is an electric motor 10 having a motor drive shaft 16 and a battery 12 configured to power the electric motor 10. A speed control 13 is utilized to control a rotational speed of the motor drive shaft 16. An elongated slider 20 is disposed partially inside the enclosure 2 having a first slider end 22 inside the enclosure 2 and a second slider end 24 outside the enclosure 2. The elongated slider 20 is configured to move back-and-forth towards the inside of the enclosure 2 and away from the inside of the enclosure 2. A gear system 14 is connected to the motor drive shaft 16 to reduce the rotational speed of the motor drive shaft 16. A drive arm 18 is connected to the gear system 14 so that when the motor drive shaft is rotated the gear system 14 rotates the drive arm 18. A first link arm end 30 of an elongated link arm 28 is rotatably mounted to the drive arm 18. A second link arm end 32 of the elongated link arm 28 is rotatably mounted to the first slider end 22, wherein rotation of the drive shaft 16 moves the elongated slider 20 back-and-forth.

An off/on switch 34 connects and disconnects power from the battery 12 to the electric motor 10. A speed control 13 controls the rotational speed of the motor drive shaft 16. Preferably, the off/on switch 34 and/or speed control 13 are connected to remote control unit 36 so that a remote control 37 can wirelessly connect to the remote control unit 36 and the user can remotely turn off and on, and/or adjust the speed of the electric motor 10. A sound device 50 can also be used to turn on the electric motor 10 when a desired sound is made, such as a duck call. For example, when the user makes a duck call, the sound device 50 can turn on the electric motor 10 for a set time period, such as from 5 to 60 seconds.

Any desired electric motor 10, gear system 14 and battery 12 can be utilized. For example, the electric motors, gear systems and batteries used in commercially available portable power tools, such as drills, saws, or other power tools from Dewalt, Milwaukee, Bosch, Makita and others. In this manner, the battery chargers can be utilized to charge the battery 12. In the example shown in the drawings a Dewalt power tool electric motor, gear system and rechargeable battery were utilized.

Figure 5A:
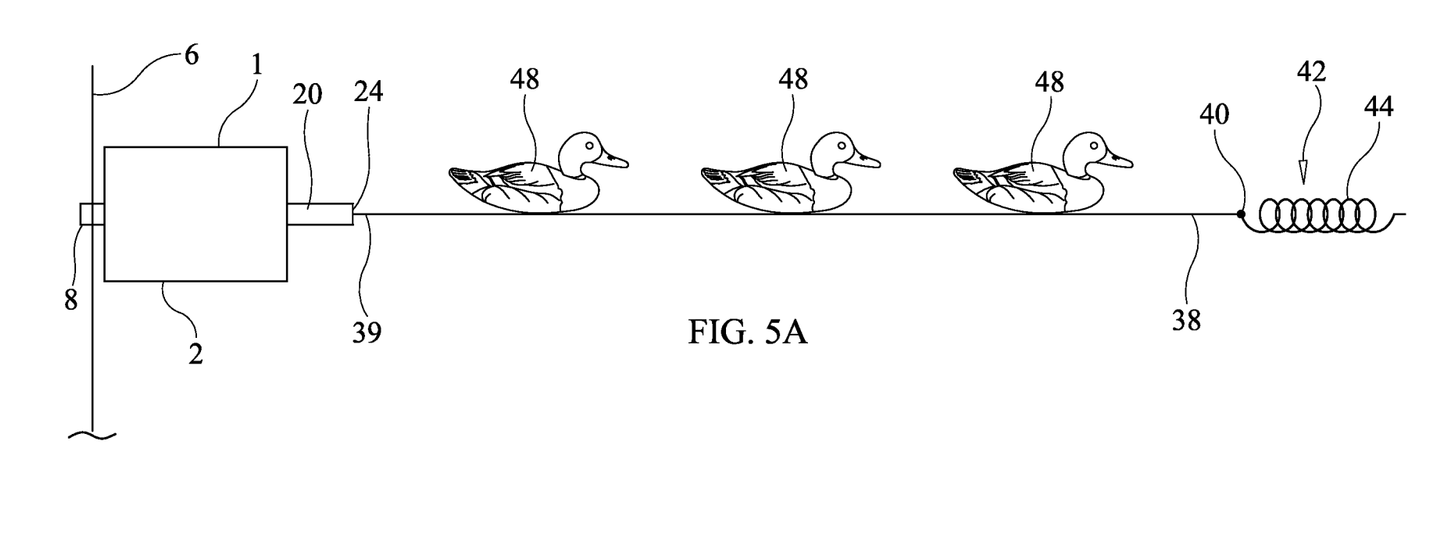
FIGS. 5A and 5B are side views of a jerk string device.
Figure 5B:
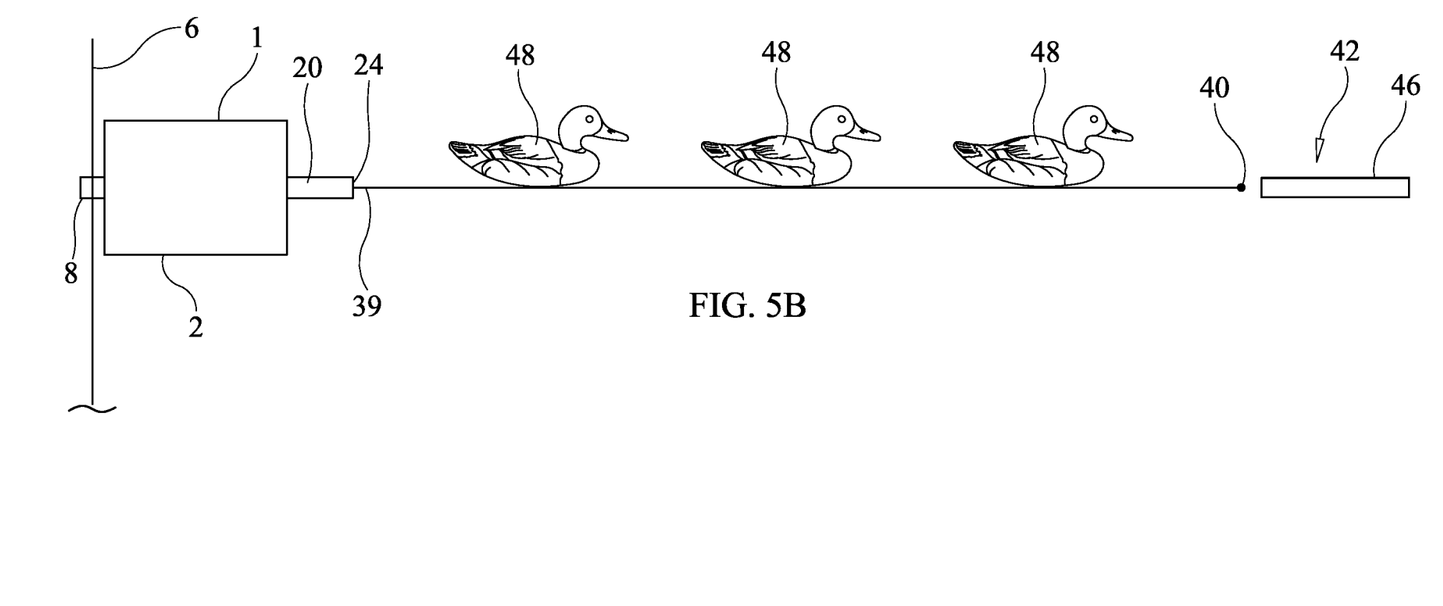
Figure 6:
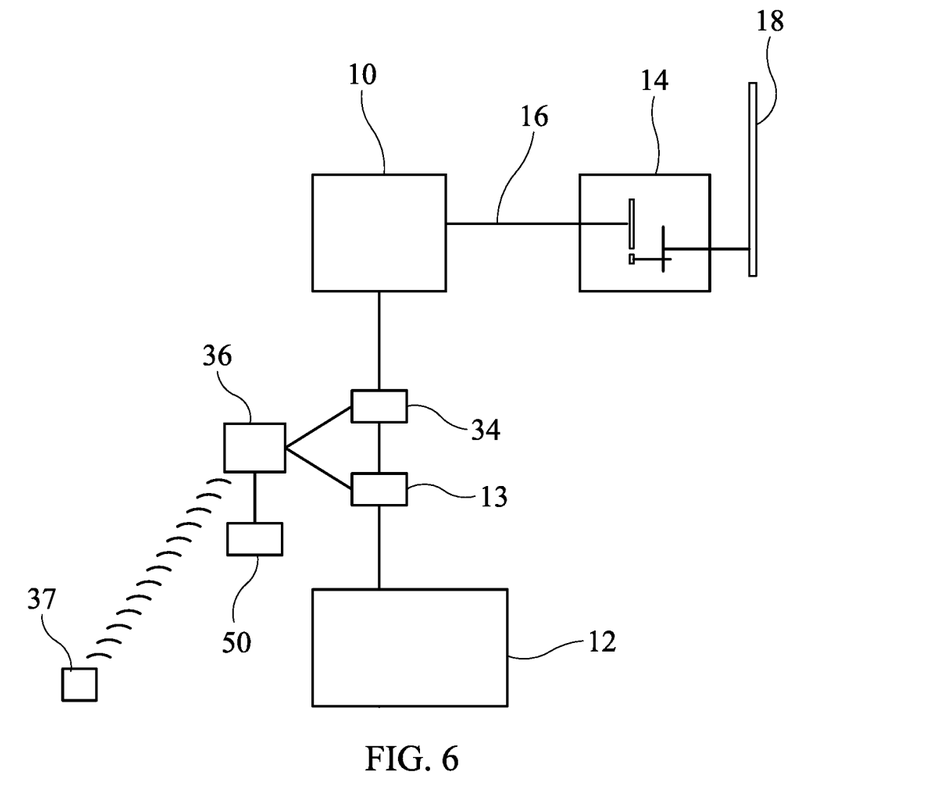
FIG. 6 illustrates parts of the decoy pull line actuating apparatus.

As shown in FIGS. 5A and 5B, to use the jerk string device 1 the mounting pole 6 is secured in location by inserting into the ground or on top of the ground. The enclosure 2 is secured at a desired height on the mounting pole 6 using the lockable mount 8. A first jerk line end 39 of a jerk line 38 is connected to the second slider end 24. A second jerk line end 40 is connected to a biasing device 42 that biases the jerk line 38 in a direction away from the enclosure 2. The biasing device 42 is secured in place with jerk line 38 taught between the biasing device 42 and the enclosure 2. A plurality of duck decoys 48 are secured spaced-apart on the jerk line 38. When the electric motor 10 is activated, the elongated slider 20 moves the jerk line 38 and duck decoys 48 back and forth, with jerk line 38 expanding the biasing device 42 when the jerk line 38 moves towards the enclosure 2 and the biasing device 42 contracting and pulling the jerk line 38 in the direction away from the enclosure 2. Examples of suitable biasing devices 42 include a spring 42 or a bungie cord 46. a plurality of duck decoys 48. The speed of the back and forth movement of the jerk line 38 can be adjusted using the speed control 13. The jerk string device 1 can be remotely operated using the remote control unit 36 and remote control 37. The faster the movement of the jerk line 38, the greater the distance the duck decoys 48 travel based on momentum of the duck decoys 48 further expanding the biasing device 42 and the greater the motion of the duck decoys 48.

Figure 8:
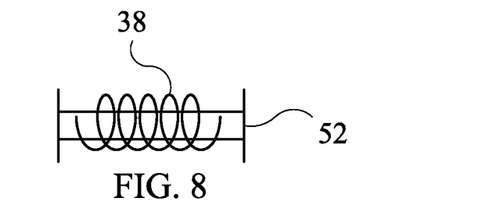
FIG. 8 illustrates a string winding device.

During storage, the duck decoys 48 can be removed from the jerk line 38 and the jerk line 38 can be coiled on a winding device 52.

REFERENCE NUMBERS

1 Jerk string device
2 Enclosure
4 Lid
6 Mounting pole
8 Lockable mount for mounting enclosure at different heights on mounting pole
10 Electric motor
12 Battery
13 Speed control
14 Gear system
16 Drive shaft
18 Drive arm
20 Elongated slider
22 First slider end
24 Second slider end
26 Slider bearing
28 Link arm
30 First link arm end
32 Second link arm end
34 On/off switch
36 Remote control unit
37 Remote control
38 Jerk line
39 First jerk line end
40 Second jerk line end
42 Biasing device
44 Spring
46 Bungie cord
48 Duck decoys
50 Sound device
52 String winding device It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:
1. A method of moving duck decoys comprising:
installing a mounting pole in or above ground near a body of water;
installing an enclosure having a sealable lid at a desired height on the mounting pole using a lockable mount, wherein
an electric motor having a motor drive shaft is in the enclosure;
a battery configured to power the electric motor is in the enclosure;
a speed control to control a rotational speed of the motor drive shaft is in the enclosure;
an elongated slider having a first slider end inside the enclosure and a second slider end outside the enclosure, the elongated slider is configured to move back-and-forth towards an inside of the enclosure and away from the inside of the enclosure;
a gear system connected to the motor drive shaft to reduce the rotational speed of the motor drive shaft;
a drive arm connected to the gear system so that when the motor drive shaft is rotated the gear system rotates the drive arm;
a first link arm end of a link arm is rotatably mounted to the drive arm;
a second link arm end of the link arm is rotatably mounted to the first slider end, wherein rotation of the drive shaft moves the elongated slider back-and-forth; and an off/on switch for connecting and disconnecting the power from the battery to the electric motor;

connecting a first jerk line end of a jerk line to the second slider end;

connecting a second jerk line end to a biasing device that biases the jerk line in a direction away from the enclosure;

securing the biasing device in place with the jerk line taught between the biasing device and the enclosure;

installing a plurality of duck decoys spaced-apart on the jerk line; and activating the electric motor to move the elongated slider, the jerk line, and the duck decoys back and forth, with the jerk line expanding the biasing device when the jerk line moves towards the enclosure and the biasing device contracting and pulling the jerk line in a direction away from the enclosure.

2. The method according to claim 1, further comprising operating the electric motor remotely using a remote control unit connected to the off/on switch and the speed control and a remote control operated by a user.

3. The method according to claim 2, wherein a speed of the electric motor is remotely controlled.

4. The method according to claim 1, further comprising the electric motor turning on when a duck call sound by a user is made and then shutting off after a set time period.

5. The method according to claim 1, wherein the biasing device comprises a spring or bungie cord.

6. The method according to claim 1, wherein the faster the movement of the jerk line, the greater the distance the duck decoys travel based on momentum of the duck decoys further expanding the biasing device and the greater the motion of the duck decoys.

* * * * *